Oct. 19, 1971 — C. W. COBURN — 3,613,309

PLANT CULTIVATION

Filed July 3, 1969 — 2 Sheets-Sheet 1

INVENTOR
CHARLES W. COBURN

Anderson, Luedeka, Fitch, Even, Tabin
ATTYS.

Oct. 19, 1971   C. W. COBURN   3,613,309
PLANT CULTIVATION

Filed July 3, 1969   2 Sheets-Sheet 2

INVENTOR
CHARLES W. COBURN

Anderson, Luedeka, Fitch, Even, Tabin
ATTYS.

United States Patent Office 3,613,309
Patented Oct. 19, 1971

3,613,309
PLANT CULTIVATION
Charles W. Coburn, Lake Forest, Ill., assignor to
Ickes-Braun Glasshouses, Inc., Chicago, Ill.
Filed July 3, 1969, Ser. No. 839,023
Int. Cl. A01g 9/02, 31/02
U.S. Cl. 47—38    3 Claims

ABSTRACT OF THE DISCLOSURE

A package for growing plants, and a system including such packages, is disclosed. As illustrated, the package is in the form of a plastic bag containing a root-supporting material, with openings being provided in the top wall of the bag through which the stems of the plants protrude. Within each bag is a liquid distributing tube and, in the disclosed system, means are provided to supply a nutrient in liquid form to the tube of each bag.

---

The present invention relates to systems for growing plants and, more particularly, to systems for growing plants in controlled environments, such as within greenhouses and the like.

It is now conventional to grow plants commercially in large greenhouses, particularly in cold climates where the outdoor growing season is relatively short. This is true not only for flowered plants, which themselves constitute the product sold, but also for fruit and vegetable crops, particularly tomatoes.

In one system for cultivating such plants, a long shallow upwardly open trough or channel is provided which extends for some distance along the floor of the greenhouse. The trough is filled with soil and the plants are placed within the trough at spaced intervals. Water and a nutrient are then supplied to the soil to sustain the growth of the plants. Such a system has several disadvantages. In the first place, it permits little flexibility in arrangement within the greenhouse since it is generally confined to use in straight rows. Moreover, the troughs must be rigid to support the soil and are thus fabricated of heavy materials and are relatively expensive. Also, the earth or other composition within the trough periodically must be replaced, particularly if the same type of plant is being grown continuously, and this replacement of the soil necessitates considerable labor in cleaning the trough and refilling it. Finally, the trough is open at the top and thus subjects the moisture in the soil to evaporation from the upper surface thereof.

Another system involves the use of individual open-topped containers in the form of boxes, each having placed therein a predetermined number of plants. Water and a nutrient is then supplied to each box. Such a system has generally the same disadvantages as the system previously referred to which utilizes an elongated trough.

It is a principal object of the present invention to provide an improved system for growing plants.

A further object of the invention is to provide an improved container for the cultivation of plants.

Other objects and advantages of the invention will become apparent with reference to the following description and the accompanying drawings.

Figure 1:
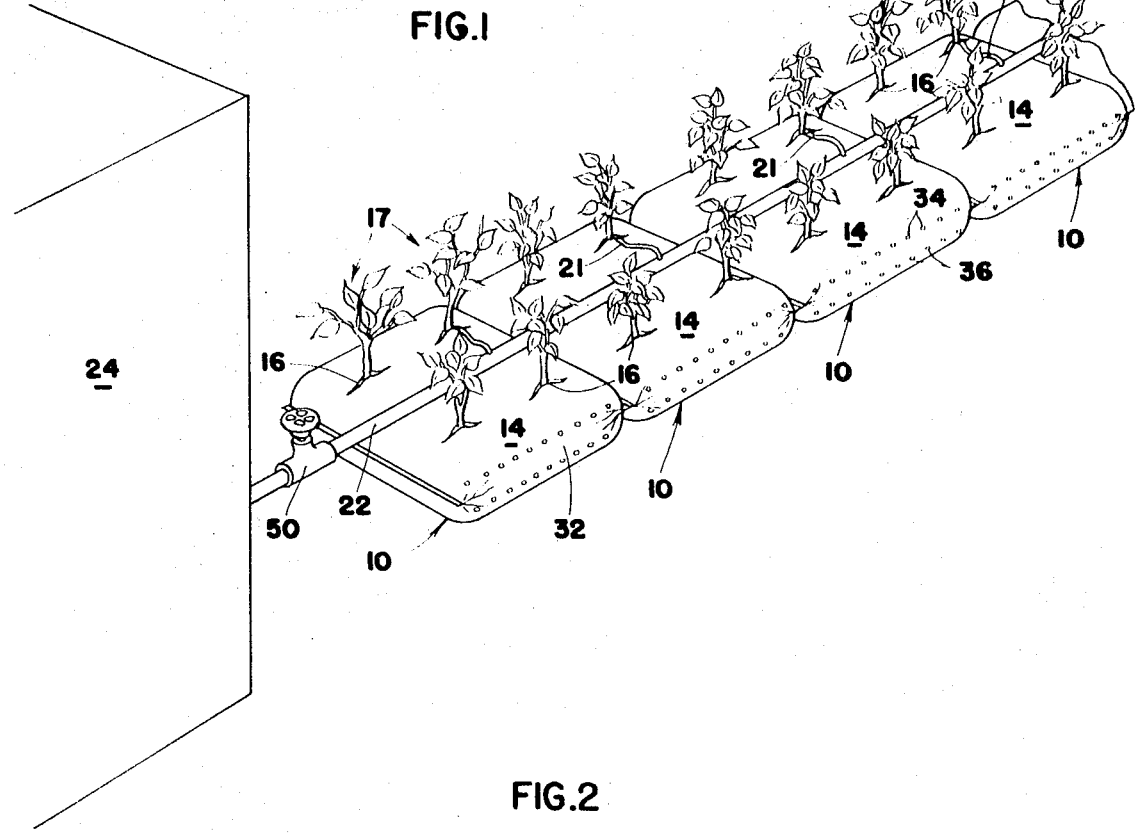
FIG. 1 is a fragmentary prospective view of a system showing various of the features of the invention.

Very generally, the system shown in the drawing includes a plurality of containers in the form of plastic bags 10, each of which is filled with and completely encloses a quantity of root-supporting material 12. The top wall 14 of each container or bag 10 is provided with an opening 16 at a number of spaced locations and, at each location, a plant 17 whose root structure is carried in a pressed peat pot 18 is disposed, with each pot being essentially surrounded by the root-supporting material 12.

Also disposed within each bag 10, beneath the top wall 14, is a liquid distributing member in the form of a length of tubing 20 which, as shown, is arranged in the form of a loop. The tube 20 is so constructed as to permit liquid to ooze out along its length at a predetermined rate. A hose 21 connected to each of the tubes 20 projects outwardly through the top wall 14 and is connected to a main supply pipe 22 through which a liquid nutrient is supplied from a source 24.

More specifically, each of the bags 10 is preferably formed of a flexible plastic sheet material which is durable enough to withstand the stresses which the bag may be expected to encounter when filled with the root-supporting material 12 and transported either in a dry state, as when the filled bag is initially delivered to the greenhouse, or in a wet state, as when the bag is removed from the greenhouse for replacement by a fresh bag.

In preparing a preferred embodiment of the bags 10, each is provided with a first seal 26 at one end, filled with the root-supporting material 12, and then provided with a second seal 28 at its opposite end. Each bag, when collapsed and before being filled, measures approximately 40 inches by 38 inches and is adapted to contain approximately one cubic yard of the material 12. After filling, the bags assume the form of a generally rectangular pillow having the top wall 14, previously referred to, a flat bottom wall 30 in contact with the floor of the greenhouse, and slightly bulging side walls 32.

Figure 3:
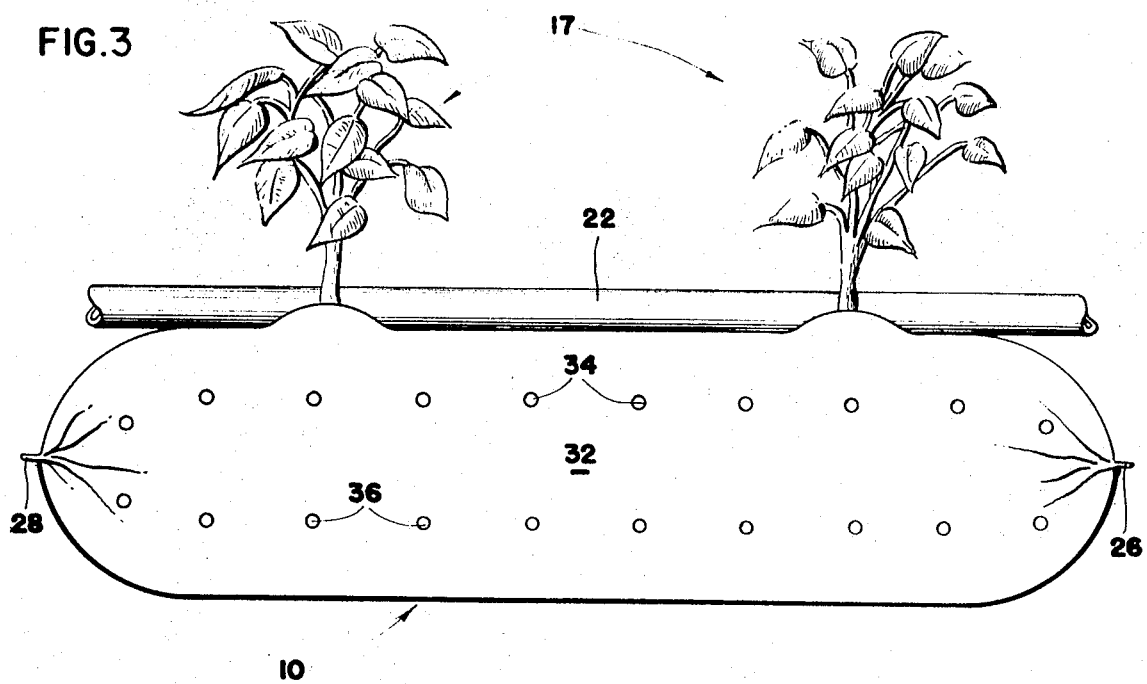
FIG. 3 is a side elevational view of one element of the system of FIGS. 1 and 2.

As can be seen best in FIG. 3, each side wall of the filled bag is provided with two parallel rows of holes 34 and 36, each row being generally horizontally disposed when the bag is lying flat on its bottom wall 30. The holes 34 of the upper row permit air to enter the bag and provide a natural means of aeration; the holes 36 of the lower row permit excess liquid, if any, within the bag to drain off onto the floor of the greenhouse.

The bags are preferably arranged in the greenhouse in line to form an elongated straight row with the ends of the bags abutting each other. A row of approximately 100 feet in length has been found to be particularly satisfactory. However, the bags could be arranged on a circular line, an L-shaped line, or define any other configuration which is adapted to the particular greenhouse layout in which they are located.

The root-supporting material 12 with which each bag is filled is generally not intended to be such as will sustain plant growth without the addition of other nutrients. In other words, it is not necessary that the material be a form of soil which in itself contains sufficient nitrogen, phosphorus, and potassium, as well as other mineral compounds, needed for plant growth. Rather, in the embodiment described, it is sufficient that the material be of such consistency as to enable it to support the roots of the plants and retain the liquid nutrients supplied from the source 24 while permitting a free circulation of air throughout the material.

In a preferred embodiment, each bag contains approximately one cubic yard of the material 12 having the following composition, stated here by way of example.

EXAMPLE—MIX

½ yard of peat
½ yard of vermiculite
10 lbs. ground lime stone
2 lbs. 20% superphosphate
1 lb. potassium
½ oz. borax
1 oz. iron chelate These ingredients are, of course, well mixed before being placed in the bag. With the above-mentioned ingredients, however, the composition is such as will permit ready circulation of liquid and air throughout.

When a filled bag is ready for use and is in its desired position within the greenhouse, i.e., positioned in a row as shown in FIG. 1, an opening 16 in the form of a slit is made at four spaced locations in the top wall 14 to receive the pots 18. In a preferred embodiment, the slits are about five inches in length and two aligned slits are provided adjacent each side wall of the bag with the adjacent ends of the slits spaced approximately 18 inches. The two rows of slits, i.e., the rows along opposite sides of the bag, are spaced approximately 16 inches apart. The slits can be made with a sharp knife, a razor, or similar sharp tool. Alternatively, the openings may be circular of a diameter approximating that of the pot 18, or may be in the form of two slits defining an X. Preferably, however, the openings 16 are provided by the consumer when the bag is ready for use so that the top wall of the bag will not be weakened and so that the material 12 will not leak through the opening during transporting of the bag. However, lines of weakness such as perforations can conceivably be provided in the appropriate locations in the top wall if desired.

The plants 17 which are eventually cultivated in the bag 10 are preferably germinated before being placed in the bag under controlled environmental conditions in the pressed peat pots 18 or pots of similar construction having side walls formed of a material through which the roots of the plant can penetrate, as when the pot is exposed to the moisture within the bag. Thus, when placed within the bag, the plants preferably have an existing root and stem structure, although they could conceivably be placed in the bags as seeds or seedlings, and even without pots.

In locating the pots within the bags, portions of the top wall 14 defining the slits or openings 16 are spread and a cavity formed in the underlying root-supporting material 12. The pots are then put in place, the material 12 moved back to enclose the pot, and the top wall 14 restored to its original position so that portions of the top wall overlie the soil within the pot and extend up to and engage the stems of the plants. In such position, the top wall functions to enhance circulation of the moisture evenly within those portions of the bag which contain the pots 18 and the plant root structure after the pot has dissolved, as hereinafter described.

Figure 2:
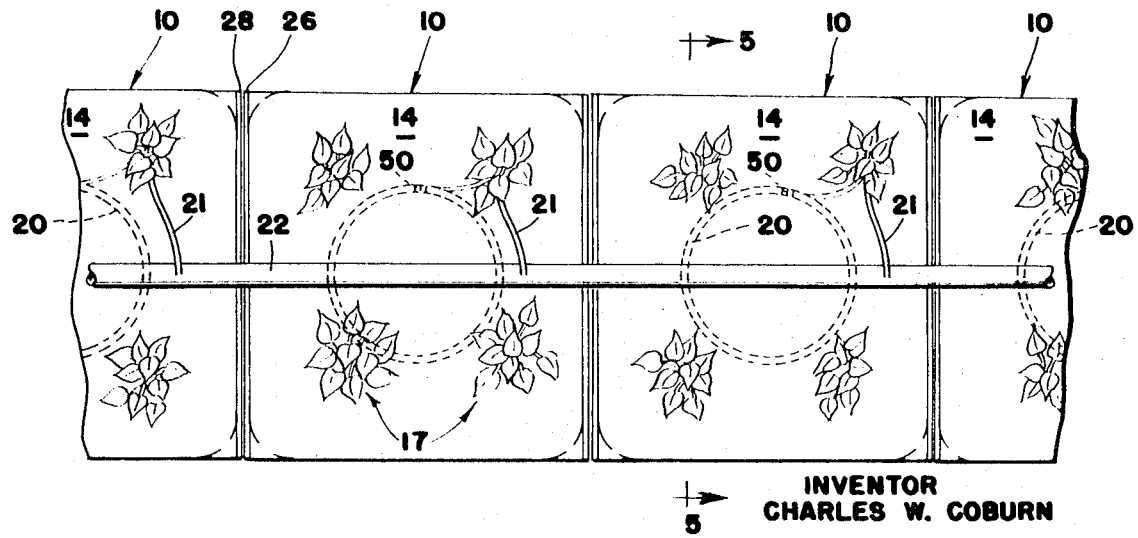
FIG. 2 is a fragmentary plan view of a portion of the system shown in FIG. 1.
Figure 4:
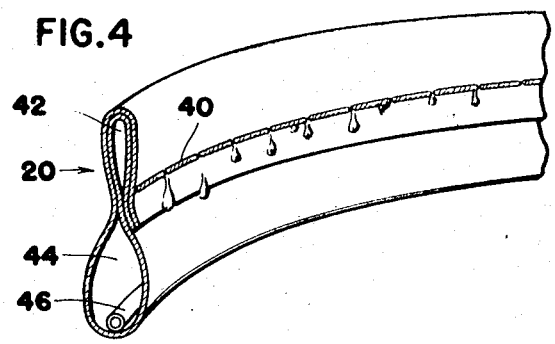
FIG. 4 is a fragmentary elevational view of another element of the system of FIGS. 1 and 2.
Figure 5:
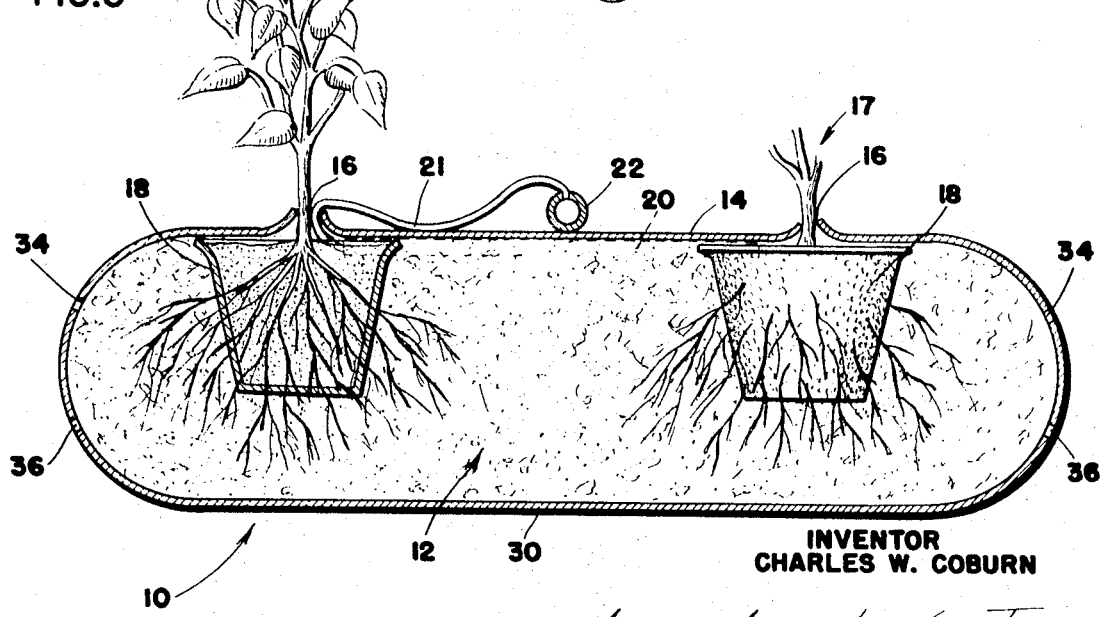
FIG. 5 is a sectional end view taken along line 5—5 of FIG. 2.

Also disposed within each bag 10 beneath the top wall 14 is the liquid distributing tube 20 which, as seen in detail in FIG. 4, is essentially formed from an elongated strip of flexible plastic sheet material folded over upon itself and secured into tubular form by a row of stitching 40 which extends through the tube walls on opposite sides and thereby collapses the tube to separate it into two sections, 42 and 44, the section 44 being significantly larger in diameter than the section 42. A length of relatively stiff plastic tubing 46 of narrow diameter is located within the larger section 44 of the tube to enable the tube to maintain a desired shape, to provide it with some measure of rigidity, and to enable it to resist to some extent its tendency to straighten out when filled with a liquid. At one of its ends, the tube 20 is secured to one end of the flexible hose 21 which communicates with the interior of the larger portion 44 of the tube, and the opposite end of the tube is closed off and sealed by a grommet 50 (FIG. 2) which includes an opening to receive the hose 21 so that the opposite ends of the tube may be held in abutting relation to each other to provide the tube with a looped configuration. Such tubing is available commercially from Chapin Watermatics Inc. of Watertown, N.Y.

When a liquid is fed into the tube 20 through the hose 21, it fills the section 44 of the tube. The tube is not watertight due to the holes formed by the stitching 40 and the capillary action of the stitching itself so that the liquid oozes out of the tube and into the bag 10 in the form of small droplets, as illustrated in FIG. 4. The oozing action is gradual, allowing the upper portion of the root-supporting material to absorb as much liquid as possible before the surplus liquid gravitates downwardly within the bag. Thus, there is little likelihood that liquid will exit through the holes 36 until the root-supporting material 12 is completely saturated. Moreover, the tube 20 is preferably arranged in a loop, as previously mentioned, permitting disposition of the liquid over a wide surface area instead of at one specified location.

It has been found that when the liquid is introduuced into a bag of the type and in the manner above described, the liquid tends to recirculate within the bag so as to maintain a uniform moisture level throughout the bag. That is, the liquid gravitates downwardly but rises again when the upper portion of the root-supporting material becomes drier than that of the lower portion. This phenomenon is believed to be due in large part to the presence of the top wall 14 which limits evaporation of the moisture directly from the upper surface of the material 12 into the atmosphere. In any event, this recirculation greatly enhances the environment of the plant insofar as its supply of moisture is concerned.

The liquid, which in a preferred embodiment is a solution of water in which certain plant foods or nutrients are dissolved, is fed to the liquid-distributing tube 20 of each bag through the main supply pipe 22 which can be formed of a light-weight material such as plastic. In this regard, the supply pipe 22 is provided with a hole (not shown) in the vicinity of each bag 10, and the outer end of each hose 21 of each tube 20 is inserted into this hole, the hole and hose being proportioned so as to provide a relatively tight fit leaving little opportunity for leakage. Such a seal is more easily assured if the walls of the pipe 22 are relatively thick. Preferably the hose 21 extends outwardly of the bag 10 for connection to the pipe 22 through one of the openings 16 of the bag.

The pipe 22 is closed at one end, its outer end, and connected at its opposite end to the source 24 of liquid nutrient. The source 24 preferably includes a tank for holding the liquid a suitable valve (not shown) for controlling the flow from the tank and, in some cases, an automatic control (not shown) for the valve to open and close the valve at predetermined time intervals. An auxiliary valve 50 may alternatively be provided and opened or closed manually. The flow from the tank may be forced, as by a pump, or may be induced by gravity. However, in most instances, the narrow diameter of the hoses 21 and the pressure required to produce the desired seepage from the tubes 20, dictates the use of a pump.

Various liquid nutrient solutions may be used, with the particular selection depending to some extent on the type of plant and the characteristics of the plant or crop desired. For the growing of tomatoes, three solutions have been found to be highly satisfactory and are set forth herein by way of example.

NUTRIENTS

Example I

| | Oz. |
|---|---|
| Potassium nitrate | 12 |
| Ammonium nitrate | 4 |
| Calcium nitrate | 8 |
| Per 100 gallons water. | |

Example II

| | |
|---|---|
| Potassium nitrate | 8 |
| Ammonium nitrate | 4 |
| Diammonium phosphate | 8 |
| Per 100 gallons water. | |

Example III

| | |
|---|---|
| Magnesium sulphate | 20 |
| Trace element mix | 6 |
| Per 100 gallons water. | |

In the use of the above-described system in a commercial greenhouse, a plurality of the bags 10 containing the root-supporting material 12 are arranged in a line extending outwardly from the nutrient source 24. This line of bags may be straight, circular or of other configuration. However, straight rows make most efficient use of space under most circumstances. It has been found that rows 100 feet long are satisfactory, such rows being made up of between 30 and 35 bags.

After each bag is in place, or after all of the bags are in place, whichever is preferred, four openings 16 are made in the top wall 14 of each, as in the form of elongated slits. The liquid distributing tube 20 is then inserted through one such opening and arranged in a loop encircling an axis passing through the center of the top wall. The hose 21 of the tube is allowed to extend outwardly of the bag through one of the openings 16. Then, a cavity is made in the material 12 beneath each opening and a plant 17 contained in a pressed peat pot 18 is placed in each cavity. The material 12 which was displaced to form the cavity is returned to some extent to its original position so as to completely enclose the pot. The stem of the plant, of course, extends upwardly through the opening 16.

The pipe 22 is then laid in place on top of the bags so as to extend down the centers thereof intermediate the plants. Suitable holes are then provided in the pipe, one for each bag, and the hoses are inserted thereinto. The pipe is connected to the source 24 and the system is ready for operation.

When the liquid flows through the pipe 22, it enters the hoses 21 and then the tubes 20, from which it oozes into the root-supporting material 12. As previously mentioned, the liquid recirculates through the material 12 within the bag and provides a fairly uniform moisture concentration within the bag.

After a number of crops have been grown in each bag, the bags may be removed and replaced by other bags containing a fresh supply of root-supporting material. Since the bags are relatively inexpensive, they may merely be discarded, preferably after emptying them of the root-supporting material, which can be used for mulch or other purposes. Replacement of the bags is a relatively simple operation. They can be easily slipped out from under the main supply pipe 22 and new bags inserted in their place. The holes provided in the pipe 22 for the original bags can also be used with the new bags, as can the tubes 20 and hoses 21.

While one specific embodiment of a system incorporating various of the features of the present invention has been shown and described, it should be clear that various modifications may be made therein without departing from the scope of the invention. For example, other forms of bags or liquid distributing tube might be employed, as well as other forms of plant containers in lieu of the pressed peat pots.

Various of the features of the invention are set forth in the following claims.

What is claimed is:

1. A system for growing plants comprising a plurality of separate bags arranged in closely spaced relation to each other, each of said bags being formed of a fluid-impervious, flexible material and being adapted to receive at least one partially developed plant, each of said bags having a top wall, side walls and a bottom wall completely enclosing a predetermined amount of space, the top wall of each of said bags having at least one opening through which the stem structure of the plant may protrude, a predetermined quantity of a root-supporting material in the space within each of said bags to receive the plant directly beneath the opening in the top wall thereof, a liquid distributing member located within each of said bags directly beneath the top wall thereof for discharging liquid within each said bag at a plurality of points spaced from one another, an elongated conduit located exteriorly of said bags and having an outlet for each of said bags, and a flexible, liquid-impervious hose passing through the top wall opening and connecting each outlet of said conduit to one of said liquid distributing members for supplying a plant nutrient in liquid form to each of said bags, each of said bags having wall openings adjacent the lower surface thereof for drainage of excess liquid.

2. A system in accordance with claim 1, wherein each of said bags includes relatively small openings adjacent the upper surface thereof for aeration of the root-supporting material.

3. A system in accordance with claim 1, wherein each of said liquid distributing members includes a section of flexible tubing formed in a loop and positioned centrally of the top wall of the bag, the tubing being provided with a plurality of fine holes from which a liquid will seep at a predetermined rate when supplied to the tubing.

References Cited

UNITED STATES PATENTS

| | | | |
|---|---|---|---|
| 954,440 | 4/1910 | Klemm | 47—34 |
| 1,446,113 | 2/1923 | Blackwell | 47—34 |
| 3,094,810 | 6/1963 | Kalpin | 47—37 |
| 3,172,234 | 3/1965 | Eavis | 47—1.2 |
| 3,241,264 | 3/1966 | Porter et al. | 47—38.1 |
| 3,361,359 | 1/1968 | Chapin | 239—145 |
| 3,362,106 | 1/1968 | Goldring | 47—56 |

ROBERT E. BAGWILL, Primary Examiner

U.S. Cl. X.R.

47—1.2; 239—145